2,879,450
PRESSURE MEASURING DEVICE

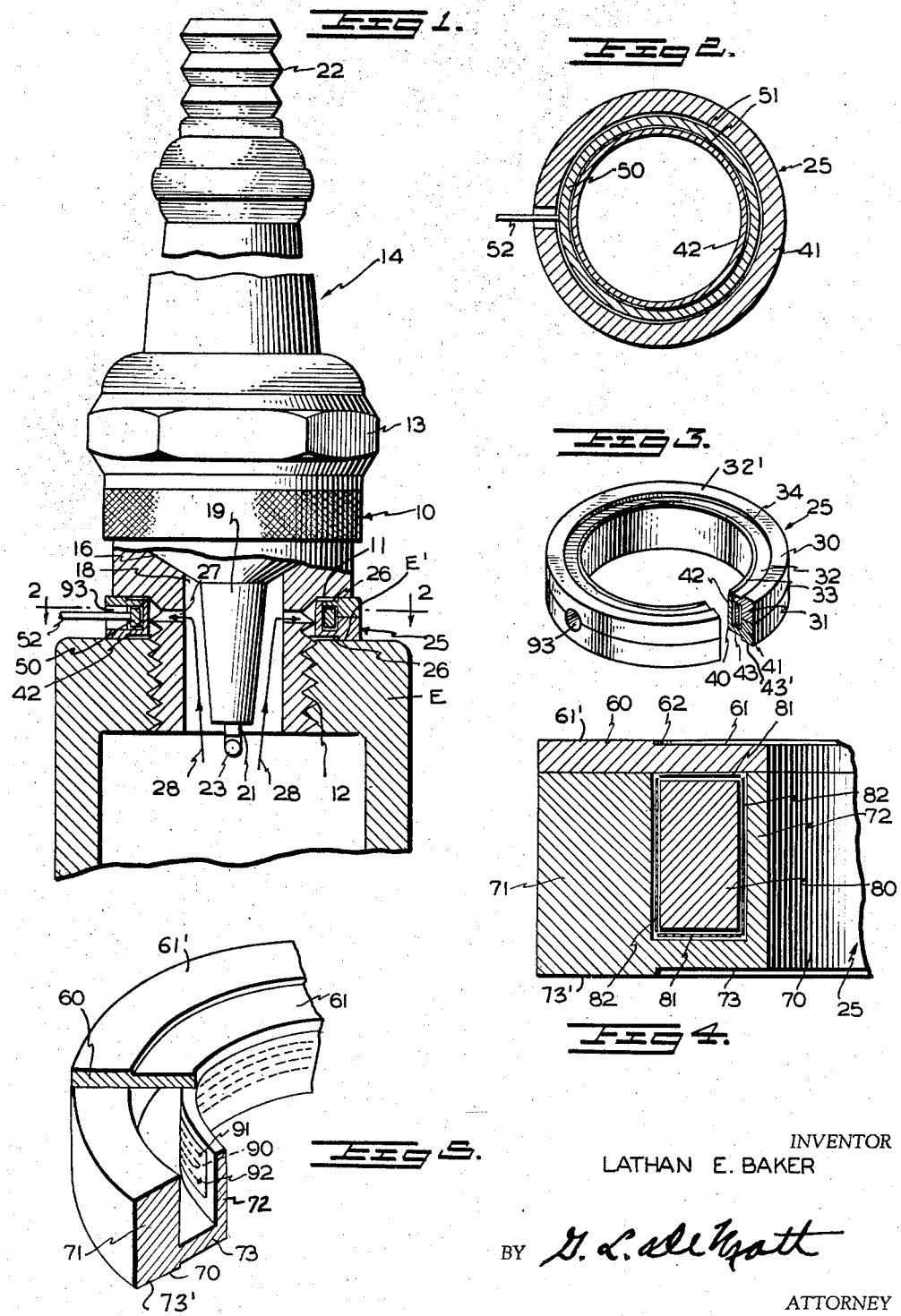
March 24, 1959 — L. E. BAKER — 2,879,450
PRESSURE MEASURING DEVICE
Filed Oct. 20, 1954
INVENTOR
LATHAN E. BAKER United States Patent Office 2,879,450
Patented Mar. 24, 1959

Lathan E. Baker, Oak Park, Mich., assignor to General Motors Corporation, Detroit, Mich., a corporation of Delaware Application October 20, 1954, Serial No. 463,551

3 Claims. (Cl. 315—58)

The present invention relates generally to a pressure sensitive device and particularly to an indicator comprising a pressure-responsive unit associated with a spark plug for measuring rapidly fluctuating pressures in combustion chambers of internal combustion engines.

In the past, employment of indicating mechanisms in which the capacity effect of a capacitor, for example, was utilized to indicate a pressure change within a combustion chamber of an internal combustion engine, required a special opening in the engine head for the insertion of a pressure-measuring unit. This, in turn, necessitated rework of the engine head, often a difficult operation. Inasmuch as an additional opening also necessarily affects combustion characteristics of the air and fuel mixture by substantially altering the volume of the combustion chamber or by impeding flame travel due to the projection of the pressure-measuring unit into the combustion chamber, the possibility of very exact pressure measurement is thereby precluded.

To alleviate the above-mentioned difficulties, devices have been developed for determining the pressure within a combustion chamber without the requirement of a special opening in the engine head. However, these devices have required specially designed plugs and have generally been in the form of means screwed into the spark plug opening and having a diaphragm as a lower surface. In operation the diaphragm would be moved by the internal pressure within the combustion chamber to different positions with respect to a stationary electrode located within the test device to thereby give a measurement of the combustion chamber pressure. As stated, these prior devices required specially designed or modified spark plugs.

It is, therefore, a principal object of the present invention to provide an indicating device which is adapted for use with conventional spark plugs, without specially designed plugs or requiring an additional opening in a wall of an engine combustion chamber, and which accordingly permits more exact measurement of pressure.

A further object of the present invention is to provide a pressure-indicating pick-up unit that may be of the electric resistance or capacity type which is adapted to be used in a suitable electric circuit for measurement of static and dynamic pressures.

A pressure responsive device in accordance with one embodiment of this invention is in the form of a gasket that is insertable under a conventional spark plug. The gasket is hollow and is provided with a deformable side wall of electrically conductive material. A central core which may be of electrically conductive material per se, or a conductive coating on an insulating base is positioned within the gasket and insulated therefrom; the core and wall of the gasket forming concentrically arranged, relatively deflectable conductive members. Air or other suitable elastic dielectric material is interposed between the gasket walls, and pressure variations within a combustion chamber are directed against the gasket through holes provided in the threaded shell of the spark plug.

Changes in the capacitance of the indicator may influence any suitable recording devices, such as meters or oscillographs, in a known manner.

In accordance with a further embodiment of this invention the central bore of the pressure responsive device is eliminated and in lieu thereof a strain gage or resistance element having a value of resistance that varies with elongation or stress is attached to the deformable wall of the gasket. By connecting the resistance element in circuit with a source of electric potential, a voltage or current may be derived from the element having a value that varies with combustion chamber pressure variations. The voltage or current so derived may influence any suitable recording devices to give a measure of the pressure variations.

The novel features that are considered characteristic of this invention are set forth with particularity in the appended claims. The invention itself, however, both as to its organization and method of operation, as well as additional objects and advantages thereof, will be best understood from the following description when read in connection with the accompanying drawing, in which:

Figure 1 is a vertical view, partly in elevation and partly in section, of a spark plug provided with a pressure indicator embodying the invention;

Figure 2 is a horizontal section taken along the lines 2—2 of the pressure indicator of Figure 1;

Figure 3 is a perspective view, partly in section, of a pressure indicator in accordance with the present invention;

Figure 4 is a partial view, partly in elevation, and partly in section, of a pressure indicator embodying the invention; and Figure 5 is a perspective view, partly in section, of a further embodiment of a pressure indicator in accordance with the present invention.

Referring to the drawing, wherein like reference numerals are applied to like parts throughout the various figures, a spark plug having a metallic shell, indicated generally by the reference numeral 10, has its lower portion provided in the usual manner with an external shoulder 11 and external screw threads 12 for installation of the spark plug in the engine designated by the letter E. The engine E is provided with the conventional seating surface E' for the spark plug. The upper portion of the shell is shown as having the conventional polygonal construction 13 to aid in positioning the spark plug in the engine. An insulator 14 of ceramic or other suitable material is positioned within the shell 10 and is supported by the internal shoulder 16 of the shell. The shell 10 defines a central bore 18 enclosing the tapered lower portion 19 of the insulator 14, this tapered portion being spatially separated from the shell wall.

Positioned within the insulator is a central electrode 21, which projects below the lower end of the insulator. Extending from the upper end of the insulator is a contact terminal 22, which has an electrical contact within the insulator with the central electrode. The ground electrode 23, projecting from the lower edge of the threaded portion 12 of the shell and extending transversely across the lower end of the spark plug, is spaced from the central electrode 21 to form a spark gap.

The spark plug is seated on a pressure-responsive device, generally indicated by the reference numeral 25, and constructed as a hollow annular sealing gasket. The threaded portion 12 of the spark plug shell has a plurality of apertures 27 in its wall and preferably extending radially therethrough and providing passages to the combustion chamber of said engine. As indicated by the arrows 28, and as will hereinafter be more fully explained, variations in pressure within the combustion chamber are transmitted through the apertures 27 to the pressure-responsive device 25 wherein they are transformed into electrical impulses for recordation by any well-known recording devices such as meters or oscillographs.

The constructional details of one embodiment of the capacitor 25 are best shown in Figs. 2 and 3. The conductive hollow ring of the capacitor 25 includes an annular top member or wall 30 provided with a flange or outer side wall portion 31 that is integral with and extends axially from the inner surface of the member 30 adjacent its outer edge. An annular recessed portion 32 is provided on the upper surface of the member 30 and extends from the inner edge 33 to a line 34 intermediate the inner and outer edges of the member. The remaining portion of the upper surface of member 30 constitutes a flat sealing surface 32'.

The conductive ring further includes an annular bottom member or wall 40 having a first flange or outer side wall portion 41 that is integral with and extends axially from the inner surface of the member 40 adjacent its outer edge, and a second longer and thinner flange or inner side wall 42 that is integral with and extends axially from the inner surface adjacent the inner edge of the member 40. An annular recessed portion 43 is provided on the lower surface of the member 40 and extends from the inner edge of the member to a line intermediate the inner and outer edges. The remaining portion of the lower surface of member 40 constitutes a flat sealing surface 43'.

Whereas the outer flanges or side wall portions 31 and 41 are given a substantial thickness, the inner flange or side wall 42 is made relatively thin and flexible. The members 30 and 40 are joined together with the ends of the flanges 31 and 41 in abutting relation and with the inner flange 42 abutting the inner edge 33 of the member 30. The members are preferably joined together with silver solder, for example, to provide pressure tight joints.

A central conductive core 50 is positioned within the annular space formed by the members 30, 40 and is separated from the members by a suitable dielectric material 51. An electrical lead 52 is secured to the core 50 in any suitable manner, as by silver soldering, for example, and conducts electrical impulses from the capacitor 25 to a recording device not shown. The lead 52 extends radially outwardly through an opening 93 in the outer side wall 31, 41.

By way of example, the annular members 30 and 40 and the conductive core 50 may be of stainless steel or similar material. While air is suitable as a dielectric, the sensitivity of the capacitor may be increased by employing a thin layer of dielectric, such as barium titanate, having a high dielectric constant, thereby insuring a large capacity change per linear distance change between the flexible flange 42 and the core 50.

Referring now to the embodiment shown in Figure 4, the conductive hollow ring of the capacitor 25 includes a top member 60 and a bottom member 70. The member 60 comprises a flat ring having a recessed portion 61 provided on its upper surface. The recessed portion 61 extends from the inner edge of the member to a line 62 intermediate the inner and outer edges of the member. The remainder of the upper surface constitutes a flat sealing surface 61'.

The bottom annular member 70 includes a first, relatively thick outer wall or flange 71 that is integral with and extends axially from the inner surface of the member 70 adjacent its outer edge, and a second, relatively thin, flexible inner wall or flange 72 that is integral with and extends axially from the inner surface of the member 70 adjacent its inner edge. The outer bottom surface of the member 70 is provided with an annular recessed portion 73 that extends from the inner edge of the member to a line intermediate its inner and outer edges. The remainder of the bottom surface constitutes a flat sealing surface 73'. The top and bottom members 60 and 70 may be joined together with silver solder. It is to be understood that while the terms "top" and "bottom" have been used for purposes of description, the position of the members may be interchanged without changing the basic structure of the device.

Mounted between and insulated from the members 60 and 70 is an annular conductive core 80. A pair of rings 81 and strips 82 of insulating material such, for example, as mica separates the core from the members.

It is thus seen that while the detailed construction of the embodiment of Fig. 4 differs from that of Figs. 2 and 3, in each instance there is provided a capacitor comprising concentrically arranged relatively deflectable conductive members including a conductive hollow ring enclosing a conductive core. The ring has a relatively thick outer wall and a substantially thinner, flexible inner wall. The capacity of the device, being a function of the spacing between the conductive core and the flexible wall, varies with flexure of the wall which in turn is a function of the pressure exerted on the flexible wall.

In operation, the capacitor 25 of the present invention is inserted between the spark plug and the cylinder head as is the usual spark plug gasket. By providing an outer wall, as formed by the flanges 31, 41 of Fig. 3, or the flange 71 of Fig. 4, having rigidity and thickness, the outer wall is able to take the clamping force produced by tightening the spark plug into the cylinder head without diminishing the flexibility of the inner wall. The flexibility of the inner wall is maintained at its maximum value by providing the recessed portions 32, 43 of Fig. 3, for example, or the similar portions 61, 73 of Fig. 4. The recessed portions furnish annular spaces 26 between the capacitor and the spark plug and between the capacitor and the cylinder head. Accordingly, the only pressure exerted on the flexible inner wall is the pressure within the combustion chamber of the engine.

The spark plug and capacitor thus form a pressure indicating assembly for simultaneously firing an internal combustion engine and measuring pressure changes within the engine. When the capacitor is employed with a conventional spark plug, the only modification required of the spark plug is the provision, in the shell portion 12 adjacent the capacitor, of the apertures 27. While only one aperture is essential, it is preferable to provide a plurality of apertures so that a faster response of the deflectable wall of the capacitor is produced by pressure changes from within the combustion chamber.

Referring particularly to Fig. 1, pressure and pressure variations within the combustion chamber are transmitted through the apertures 27 to the flexible wall 42 of the capacitor. Inasmuch as the inner wall 42 is sufficiently thin to be deflected by external pressure and thus to alter the electrical characteristics of the capacitor 25, the capacity will change in accordance with pressure variations in the engine cylinder. As the wall 42 is deflected radially toward the stationary conductive core 50 by an increase in pressure, the decrease in distance between the wall and the core mounted adjacent thereto results in a capacity increase which can be measured by appropriate electrical devices connected between the line 52 and the deformable conducting wall 42.

The electrical capacity of the pressure indicator, due to the separation of the conductive members, may be part of the tuned circuit in an oscillograph detector unit. Any variation of capacity in the indicator caused by deflection of the wall 42 will change the tuning of the circuit and thus alter its response to a constant frequency generated by a stable oscillator. Any change of response may be amplified before it is passed to a viewing or recording oscillograph in known manner.

The pressure responsive device hereinabove described provides a measure of pressure variation in terms of electrical capacity variation. Referring now to Fig. 5, a pressure responsive device for providing a measure of pressure variations in terms of changes in an electrical resistance in accordance with the present invention includes a hollow ring identical to that described and shown in Fig. 4. The ring includes the top member 60 having a recessed portion 61 and a flat sealing surface 61' and the bottom member 70 having spaced outer and inner side walls 71, 72 and the recessed portion 73 and a flat sealing surface 73'.

In lieu of the conductive core 80, the device of Fig. 5 includes a conductive element in the form of an electrical resistance or strain gage 90 affixed to and insulated from the inner flexible wall or flange 72. Suitable electrical connections are made to the terminals 91, 92 as by silver soldering. If preferred, one of the terminals, 91 for example, may be electrically connected to the wall 72 and an electrical lead similar to that of lead 52 in Fig. 2 may provide a connection to the terminal 92.

The operation of the variable resistance pressure responsive device is similar to that of the capacitor 25. Pressure variations within the combustion chamber are transmitted through the apertures 27 in the spark plug to the flexible wall 72. Flexure of the wall varies the tension on the strain gage 90 whereby the value of resistance of the gage is altered. Accordingly, the electrical resistance of the device is a function of the pressure and pressure variations within the combustion chamber.

To obtain a measure of the pressure changes within the combustion chamber when employing the variable resistance device of Fig. 5, the strain gage 90 may be made a part of the input circuit of a voltage amplifier, for example, or may be one arm in an electrical bridge circuit of the Wheatstone type. The output of the amplifier or the unbalance of the Wheatstone bridge may be indicated on any suitable meter.

It is thus seen that a pressure responsive device constructed in accordance with the present invention is particularly suitable for use in conjunction with a spark plug for indicating pressure variations in a combustion chamber. The employment of this device for such a purpose does not require a special plug or modification of the engine head. Accordingly, the engine is unaffected by installation of the device and more exact measurements of pressure are permitted.

While the described embodiments of the present invention constitute preferred forms, it is to be understood that other forms might be adopted, all coming within the scope of the following claims.

What is claimed is:

1. In combination, a spark plug for internal combustion engines having a shouldered shell, a pressure responsive device to indicate pressure changes within the combustion chamber of such an engine, said engine having a seating surface for said spark plug, said pressure responsive device being formed as a hollow annular sealing gasket adapted to be placed between said spark plug shoulder and said engine seating surface, said gasket having a top wall engaging said spark plug shoulder and a bottom wall engaging said engine surface, the inner portion of said top wall and said bottom wall respectively forming an annular recess, the outer portion of said top and bottom wall respectively forming flat sealing surfaces, said gasket having inner and outer side walls, said outer side wall extending between said sealing surfaces and being of substantial thickness, said inner side wall being relatively thin and flexible, an electrical pressure sensitive device within said gasket being in operative relation with the inner side wall, said pressure sensitive device having an electrical lead connected thereto, said outer side wall having an opening extending outwardly from the hollow of said gasket for receiving said electrical lead, said spark plug shell having at least one radially extending through-passage adjacent said inner side wall of said gasket to connect said inner side wall with the combustion chamber of the internal combustion engine.

2. The combination claimed in claim 1, in which the electrical pressure sensitive device within the gasket is an electrical capacitor.

3. The combination claimed in claim 1, in which the electrical pressure sensitive device within the gasket is an electrical resistance element secured to said inner side wall and having a resistance varying with stress.

References Cited in the file of this patent
UNITED STATES PATENTS

| | | |
|---|---|---|
| 2,571,507 | Welch | Oct. 16, 1951 |
| 2,652,517 | Van Degrift | Sept. 15, 1953 |
| 2,652,518 | Freeman | Sept. 15, 1953 |